Jan. 26, 1943.  E. WILSON ET AL  2,309,148
HYDRAULIC MOTOR SYSTEM
Filed Sept. 14, 1939  6 Sheets—Sheet 1
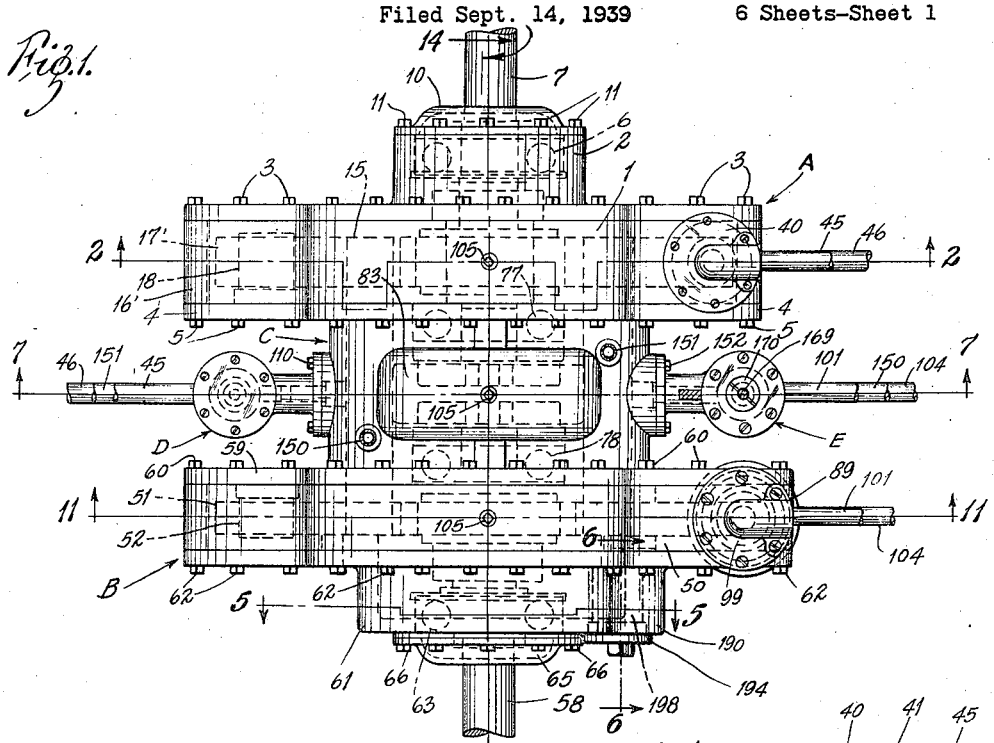
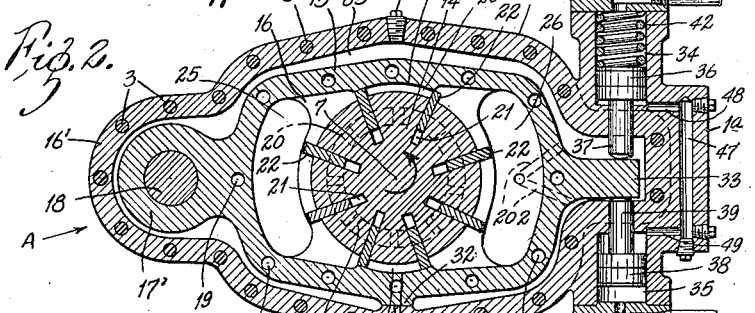
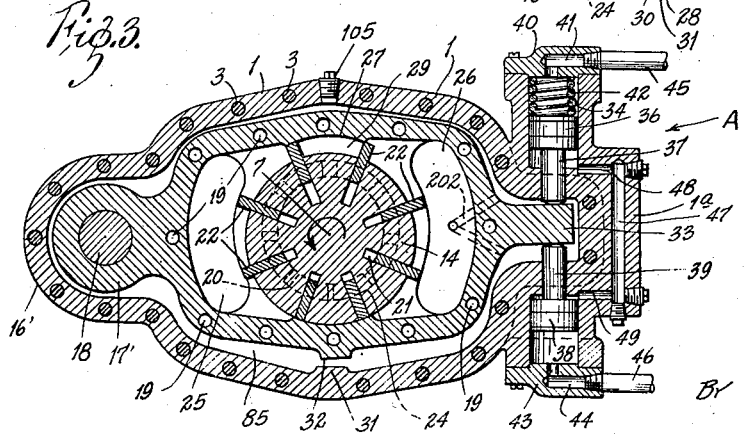
INVENTORS:
EDWARD WILSON,
EDWARD H. WILSON,
JOHN H. LINHARDT,
By Bruce S Elliott
ATTORNEY.

Jan. 26, 1943.  E. WILSON ET AL  2,309,148
HYDRAULIC MOTOR SYSTEM
Filed Sept. 14, 1939  6 Sheets-Sheet 2
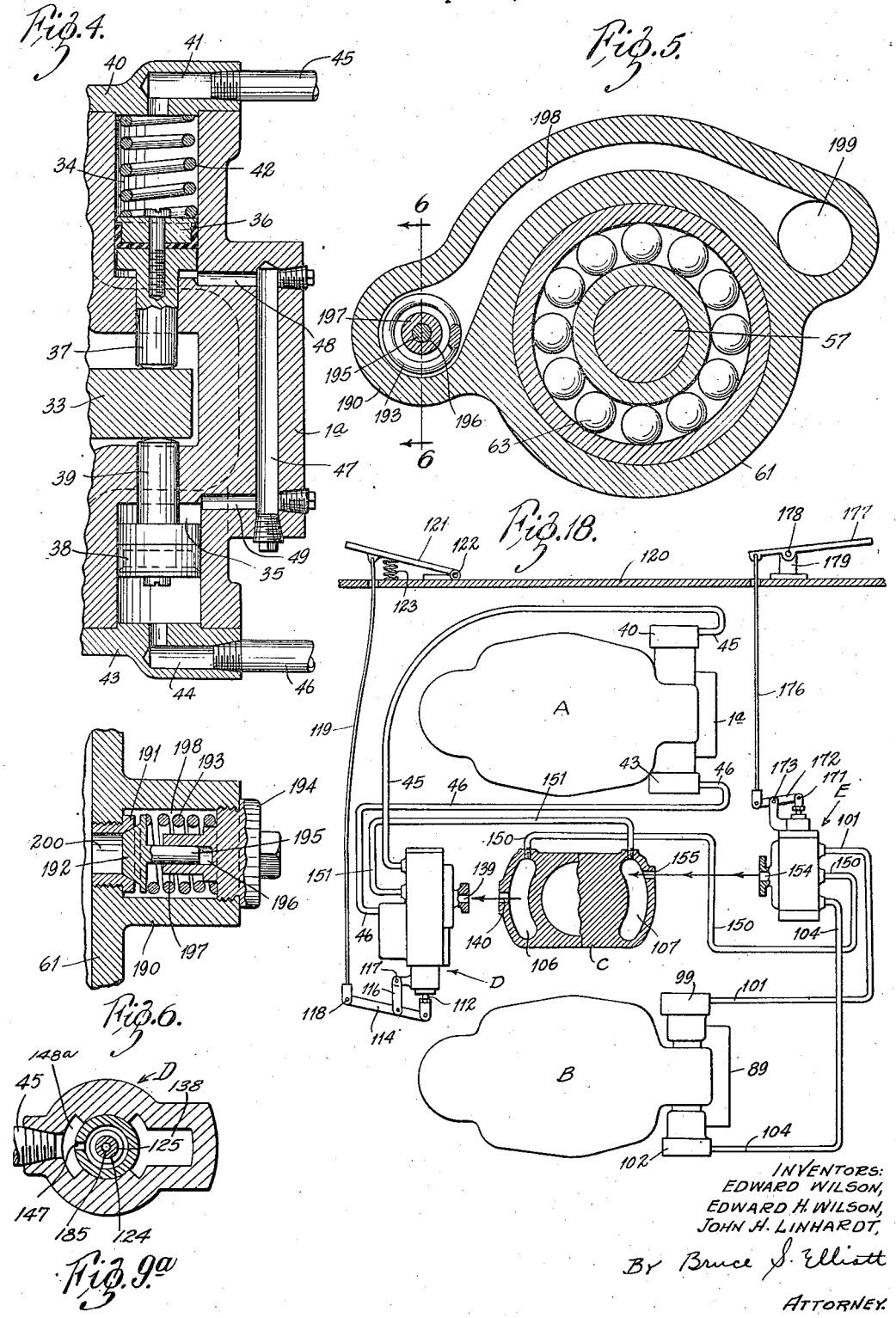
INVENTORS:
EDWARD WILSON,
EDWARD H. WILSON,
JOHN H. LINHARDT,
By Bruce J. Elliott
ATTORNEY.

Jan. 26, 1943.  E. WILSON ET AL  2,309,148
HYDRAULIC MOTOR SYSTEM
Filed Sept. 14, 1939  6 Sheets-Sheet 3
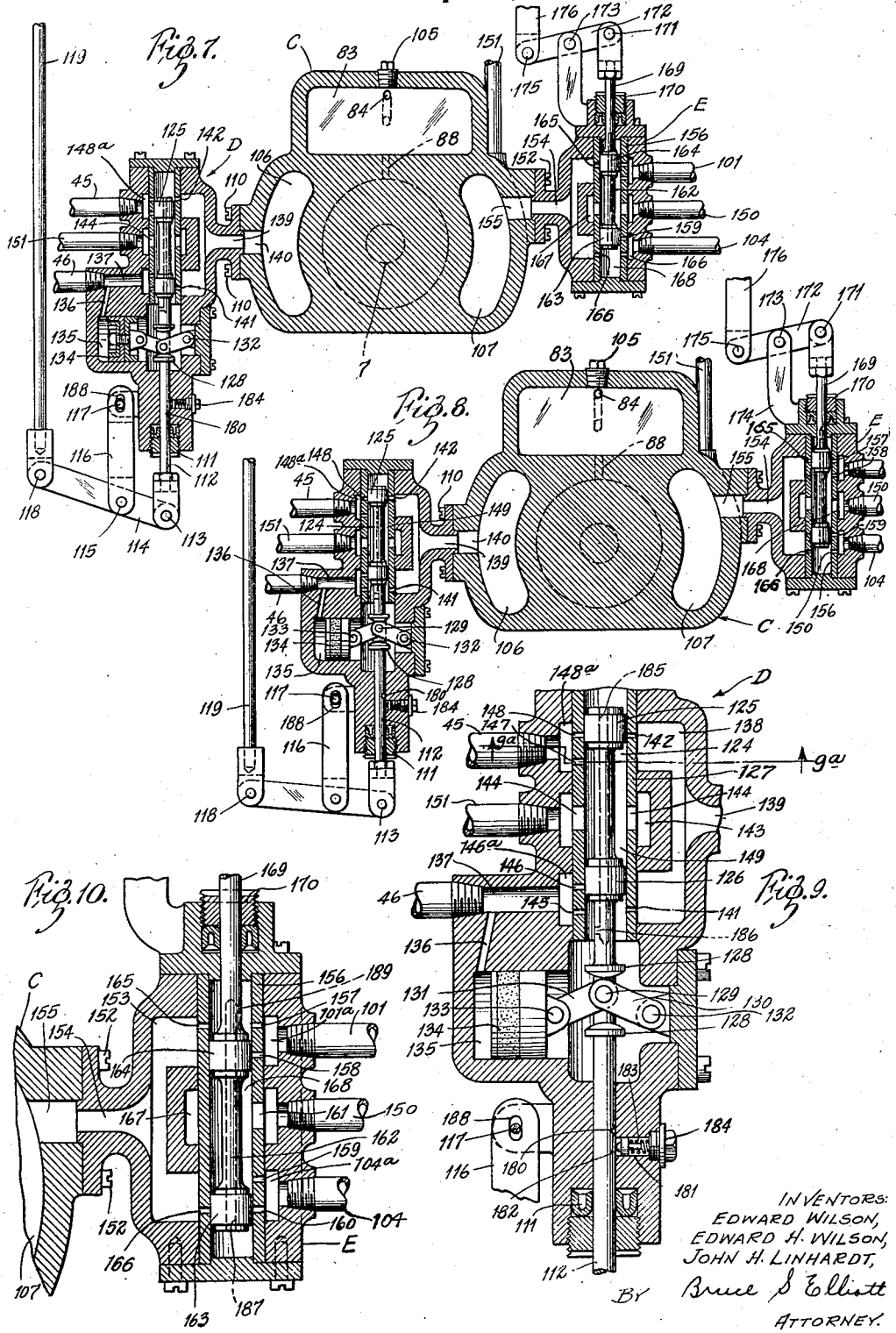
INVENTORS:
EDWARD WILSON,
EDWARD H. WILSON,
JOHN H. LINHARDT,
BY Bruce S Elliott
ATTORNEY.

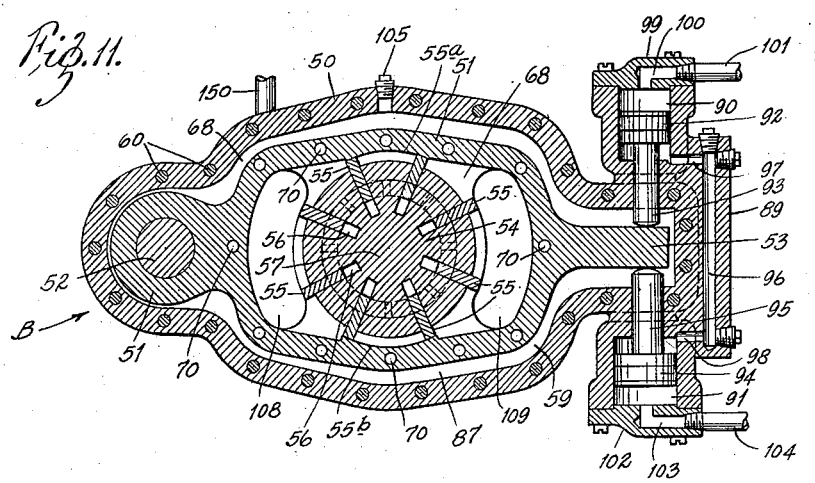
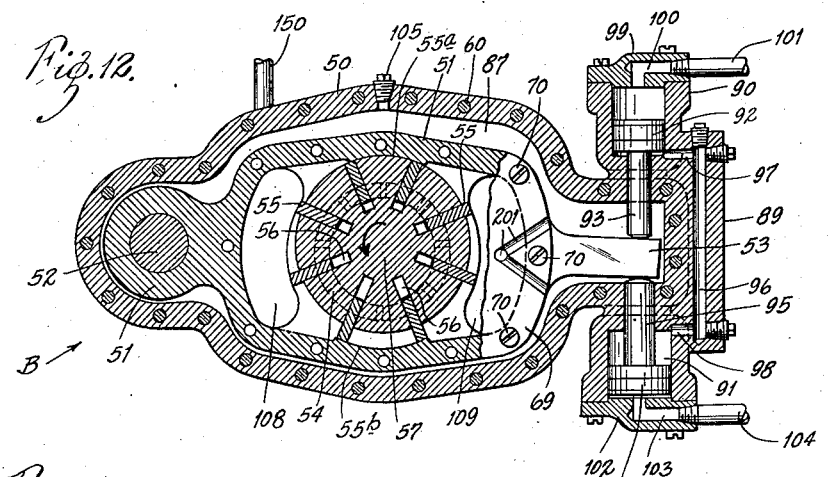
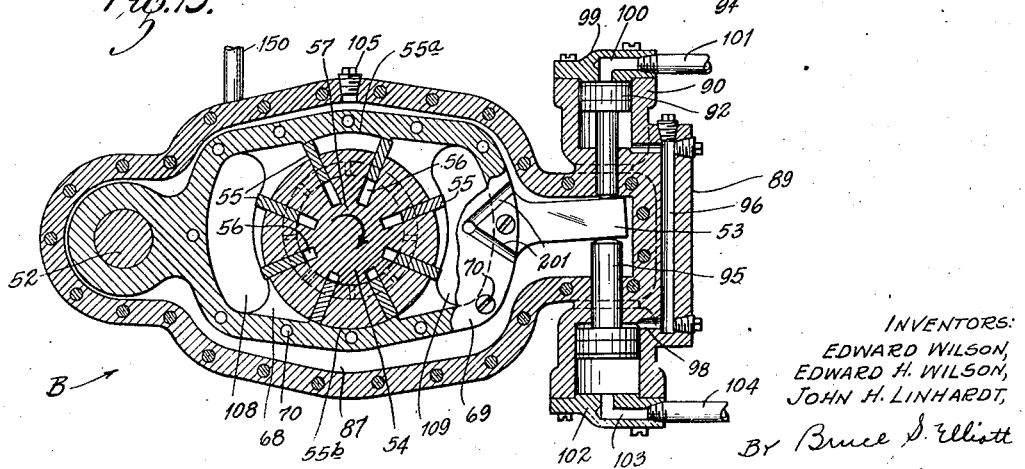

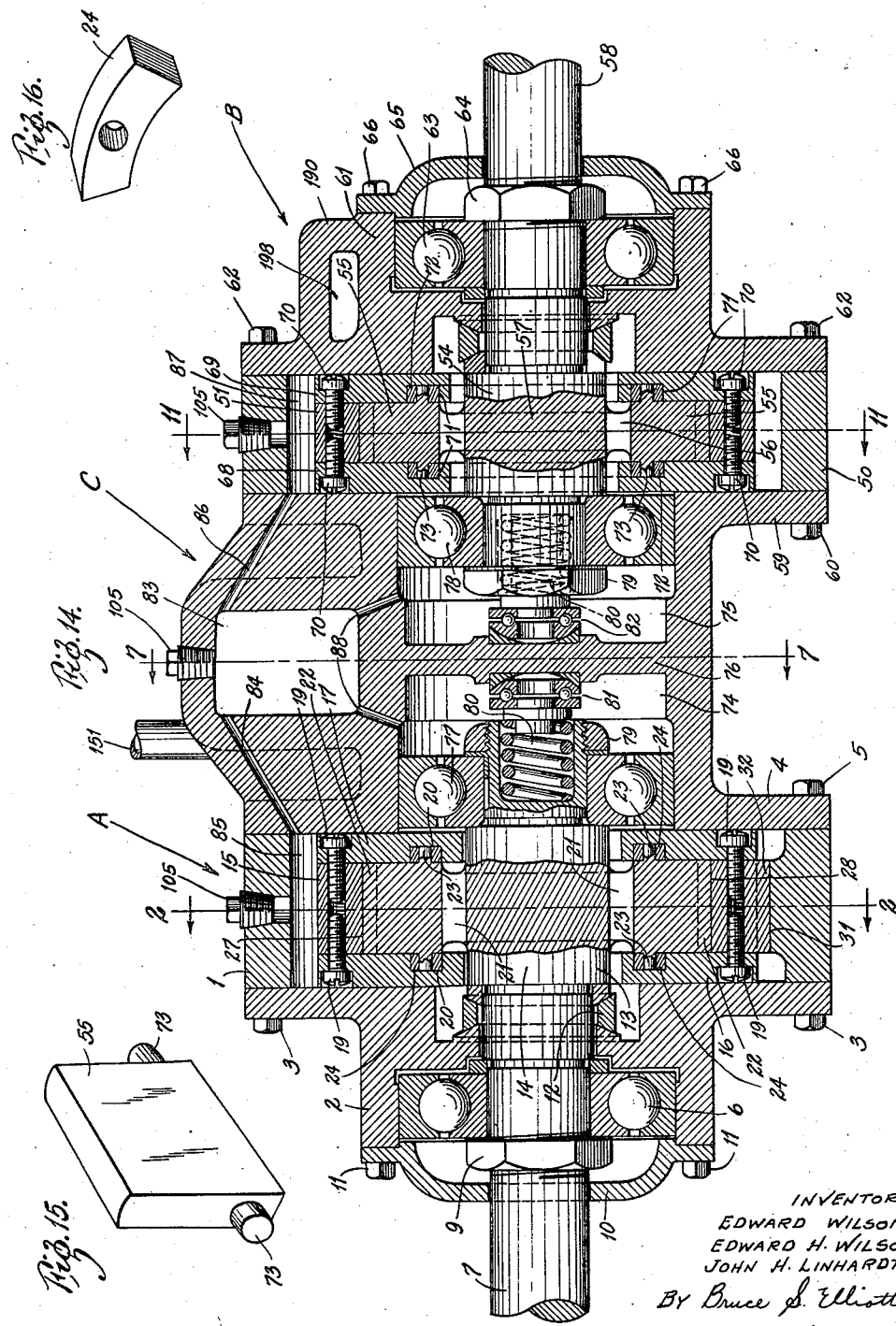

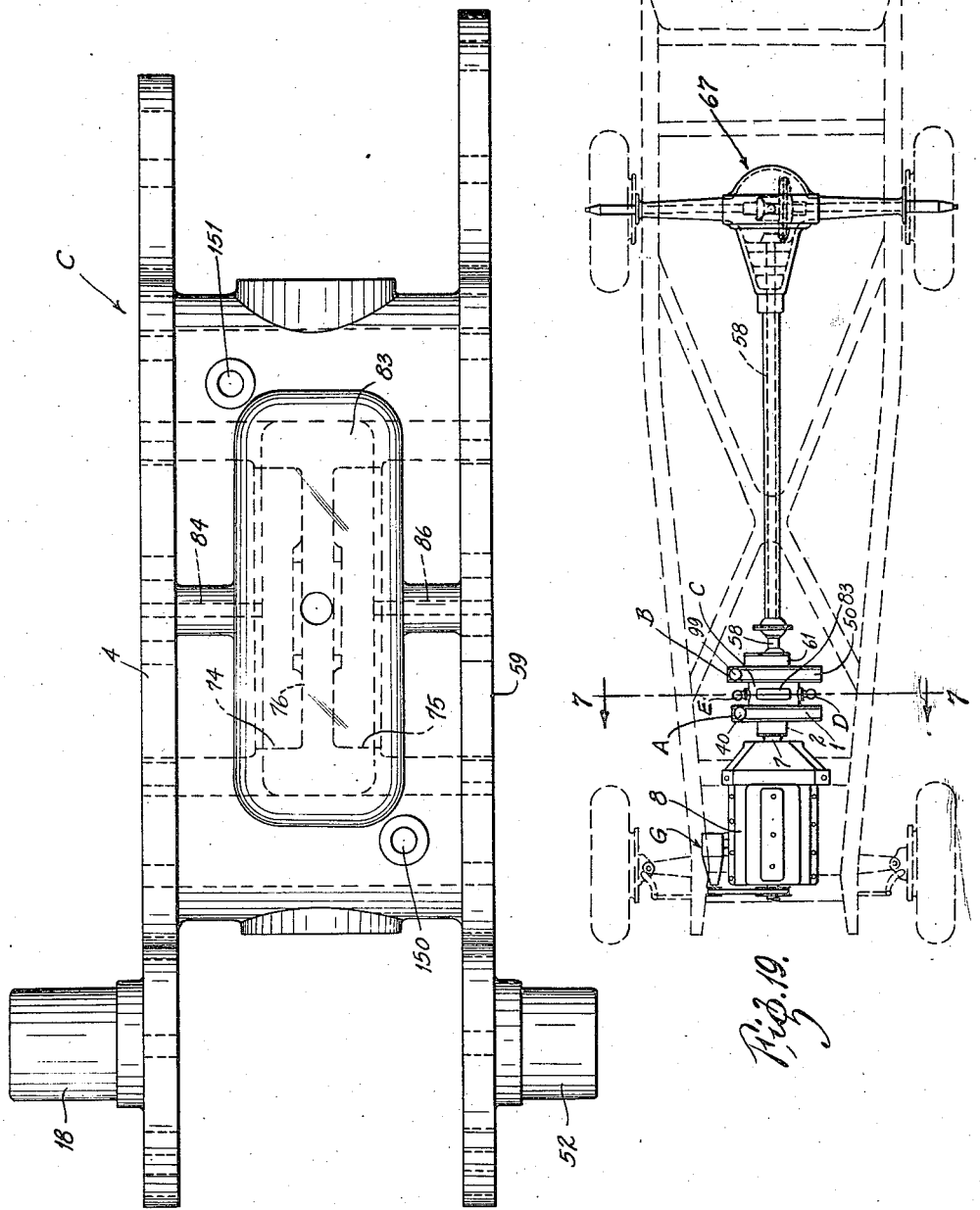

Patented Jan. 26, 1943

2,309,148

UNITED STATES PATENT OFFICE 2,309,148

HYDRAULIC MOTOR SYSTEM

Edward Wilson and Edward H. Wilson, Webster Groves, and John H. Linhardt, St. Louis, Mo.; assignors to said Edward Wilson, as trustee Application September 14, 1939, Serial No. 294,932

6 Claims. (Cl. 60—53)

This invention relates to hydraulic motors of the type in which a body of pressure fluid is caused to actuate a rotor which functions as a prime mover.

Essentially, the broad idea of the invention consists in combining an automatically governed, constant speed engine with a variable displacement, rotary pump and a fluid driven motor, and combining hydraulic control devices therewith in such manner that desired variations in the displacement of fluid may be effected by adjusting the position of the casing of the pump rotor to govern the speed of rotation of the motor; and the latter may be positioned to operate in a forward or reverse direction at any speed by the pressure of the fluid produced by the pump.

In a hydraulic motor system having the characteristics indicated, it is one of the objects of the invention to provide novel means for hydraulically controlling the position of the rotor casing of the pump.

It is a further object of the invention to provide novel means for hydraulically moving the rotor casing of the motor to a position to effect a forward rotation of the motor, or to a position to effect rotation of the motor in a reverse direction.

It is a further object of the invention to provide a hydraulic motor system embodying an automatically governed constant speed engine with a pump and a motor having casings entirely filled with fluid, the pump having a shaft-driven rotor provided with radial slide blades, and a casing angularly adjustable relative to the rotor to effect a variable displacement of the fluid by the blades of the rotor; and the motor having a construction similar to that of the pump, the casing whereof is operatively connected with the casing of said pump, whereby the pressure on the fluid effected by the rotation of the pump rotor will be transferred to the blades of the motor rotor and will drive said rotor in a forward or reverse direction according as its casing is adjusted with reference thereto in an extreme upward or downward position.

It is a further object of the invention, in a hydraulic motor system of the character described, in which a pump casing inclosing a bladed rotor is adapted to be adjusted with respect to said rotor to effect a variable displacement of fluid for driving the motor of the system, to provide pressure operative devices for moving said casing in one direction or the other, a fluid pressure system including said devices, manually operated means for initially exerting pressure on the fluid to operate said devices and move the rotor casing, and valve mechanism controlled by said manually operated means to thereafter govern the application of pressure to said devices.

It is a further object of the invention, in a hydraulic pump system of the character described, to provide manually operated valve mechanism for hydraulically controlling the operation of the pump, and to provide separate manually operated valve mechanism for hydraulically controlling the operation of the motor, the latter being adapted to be positioned to cause either a forward or reverse rotation of the motor, and the valve mechanism for the pump being operable to effect movement of the casing of the pump rotor to various positions to regulate the speed at which the motor is driven and thereafter to hold the pump casing in its adjusted position.

A further object of the invention is to provide a casing for a rotor, whether the latter be axially driven, as in the case of the pump, or peripherally driven as in the case of the motor, in which contact surfaces for the blades of the rotor of limited extent are provided at opposite sides of the rotor casing, said contact surfaces being arcuate in shape and of a length equal to the distance between two blades of the rotor.

A further object of the invention is to provide a circular groove in the end walls of the casing of both the motor and pump for receiving curved slide-blocks, or shoes, mounted on opposite sides of both sets of the rotor blades, whereby to cause said blades to rotate at all times concentrically with respect to their rotor cylinder, although in adjusted positions of the latter their outer ends may be at varying distances from the periphery of the rotor. This positive guide for the rotation of the blades enables them to pass under, without engaging the ends of, the arcuate contact surfaces with which the blades cooperate in effecting displacement of the fluid, and to prevent knocking and noise in operation, as these surfaces are struck from the same center as the circular grooves which hold the blades in concentric position.

It is one of the outstanding features of our invention that with a pump and motor combined and cooperating in the manner above stated, there is immediate reaction from differential pressures in the pump and the motor, so that if the rotor of the motor should rotate at a speed greater than that at which, for any given adjustment of the pump, it would be driven by the pressure on the fluid created by the pump, the excess pressure so produced in the motor will react on the rotor of the pump and build up a back pressure which will act as a brake on the motor and slow down the speed of rotation thereof; or, similarly, if the rotor of the pump should be in neutral, or intermediate, position, and the rotor of the motor should be rotated, as, in the case where the motor is utilized for driving an automobile and the latter should start to descend a hill with the rotor of the pump in the position described, then the rotor of the motor becomes a pump and will generate a back pressure which will automatically act to brake the movement of the car to any desired extent, under control of the operator.

On the other hand, our improved hydraulic motor system prevents backing up of an automobile to which it is applied, as should the automobile be stopped when climbing a steep incline. In such case, the motor is at once converted into a pump, driven by the car wheels, and with no outlet for the oil which the motor is trying to displace, thereby preventing backward movement of the car.

It is a further feature of the invention that as the motor is driven directly by fluid pressure created by a variable displacement pump, our improved hydraulic motor system will operate with the maximum of efficiency at any selected speed of rotation, as the pressure fluid merely circulates from the high pressure side of the system to the low pressure side, and then back to the high pressure side under the power exerted by the blades of the pump rotor. Whether the pump casing be adjusted to effect a maximum displacement of oil by its rotor, or whether the adjustment be such as to effect a less than maximum displacement, the rotative effect on the motor will be exactly proportional to the quantity of oil pumped, the pressure of which will vary with the demand of the load.

Furthermore, and for the same reason, it will be seen that the pump rotor being driven, its casing can be at once adjusted to effect maximum displacement of fluid by its rotor to drive the rotor of the motor, which will as rapidly respond, so that the highest desirable speed can be effected as quickly as would be possible with a steam operated engine.

The device is intended to be driven by a constant speed engine, the speed of which is governed by an automatic governor, which increases the fuel supplied as the load increases, and vice versa.

The principle of operation characterizing our invention, is capable of application in various arts and for various purposes. Among these may be mentioned its use as a motor for aeroplanes and automobiles; as the power source for driving machine tools; for power transmission generally; and for variable speed driving mechanism.

In the present case, the invention is illustrated in its application as a motor for driving automobiles; and in this application it embodies a rotary fluid pump, the shaft of which is driven from a governed internal combustion engine; preferably of the Diesel type and a motor of the same general character as the pump, driven by fluid pressure produced by the pump, and having a driven-shaft, which is the driving shaft of the automobile. Therefore it is possible to set the car speed at 40 or 60 miles per hour which will not vary appreciably whether going along a level road and suddenly starting up a hill or going down a hill. The casing of the pump and that of the rotor are adapted to be entirely filled with a fluid, preferably oil, and to be connected by suitable inlet and outlet conduits, or ports, so that as the pump is operated the pressure from the oil in its casing will be transmitted to the oil in the casing of the motor to operate the rotor thereof.

Suitable valves controlling the movements of the casing of the pump rotor and the casing of the motor rotor, respectively, are arranged to be automatically operated by fluid pressure, after being first manually operated, whereby the driver of the car, by the use of the simple control devices, such as foot pedals, or the like, can manipulate the valves to operate the car in either a forward or reverse direction, and control the speed of its movement in either direction. No gear shift is used, no clutch pedal is used and no brake pedal is required. An emergency brake lever only is used. Only one foot pedal is required to control the forward speed and reverse speed of the car.

An outstanding feature of the invention resides in the fact that a fluid driven rotor having radial slide-blades is mounted for rotation in a casing which is capable of being controllably moved by the operator of the car in either direction relative to the rotor, whereby the spaces between the periphery of the rotor, and segmental contact surfaces for the blades provided at opposite sides of the rotor casing, may be changed at will to transfer the effective pressure of the oil to one side or the other of the rotor, according to whether the car is to be driven in a forward or reverse direction. In the case of the pump, the casing may be moved to equalize the distance between opposite sides of the rotor and the contact surfaces for the blades, to place the rotor in neutral position; that is to say, in a position in which the blades will exert equal pressure on the fluid at opposite sides of the rotor, and hence no pressure will be transferred to the motor and no actuation of the rotor thereof will occur. When the car is being driven at high speed, if the foot is removed entirely from the control pedal, then an emergency application of braking force is immediately applied. In the case of unconsciousness or death of the driver of the car, an emergency brake application is automatically made, because the motor driven by the car then becomes a pump with no space for its volume of oil to go except through the by-pass valve to the suction side of motor. As it is never necessary to reverse the direction of the rotation of the rotor of the pump, the casing is simply adapted to be moved from the neutral position described to a position of maximum displacement, or to any point between these extreme positions, according to the speed at which it is desired the motor shall be driven. Another outstanding feature, is the fact that the great flexibility of the transmission permits the use of the most efficient type of power unit as for instance the Diesel engine so that gas mileages of 50 to 75 miles per gallon of fuel are quite possible.

As to either the motor or the pump, the power unit comprises an outer casing of greater length than width, an inner casing of the same general shape but of less size, having a pivotal mounting at one end in a circular extension at one end of the outer casing, and provided at its other end with an arm extending into an extension at the other end of the outer casing. Mounted on opposte sides of this latter extension are two cylinders connected with the fluid pressure system, having pistons therein provided with piston rods which extend through fitted openings, or bearings, in the opposite walls of the casing extension and engage opposite sides of the projecting arm of the inner casing. Located within the inner casing is a rotor provided with a plurality of radial blades mounted in the rotor for sliding movement. The opposite walls of the rotor casing are provided with two curved surfaces providing arcs of contact for the blades, said curved surfaces being in extent equal to the distance from the outer side of one blade to the outer side of the blade adjacent thereto. Each of the pistons is adapted to be controllably actuated for moving the inner, or rotor casing, through the medium of hydraulic valves which are in turn controlled by the operator by means of ordinary foot pedals or the like. The hydraulic valves are operatively connected by suitable conduits with the main hydraulic system, so that by manipulating the valves the flow of the pressure fluid to the respective cylinders of the motor units is controlled and directed to move the rotor casings in one direction or the other, whereby to increase or diminish the surface area of the blades and thus, in the case of the motor, enable the operator to drive in a forward or reverse direction, or, in the case of the pump, to place the rotor in a neutral position relative to the two areas of contact, so that the rotor will simply idle, and no motion in either direction be imparted to the car. As the rotor casing of the motor is moved in one direction or the other beyond a theoretical neutral position, the arcuate contact surface on one side of the casing will be moved into contact with the periphery of the rotor, and that at the opposite side be moved the maximum distance away from the periphery of the rotor, and thus the blades of the rotor at this latter side will project a maximum distance from the rotor to engage the corresponding curved contact surface of the casing, and thus present a maximum area to the pressure fluid, while the blades at the other side are entirely prevented from any outward movement by the fact that the rotor casing is moved the maximum distance to bring the curved surface into engagement with the periphery of the motor. The motor cylinder must be moved to its most remote position from the center of its rotor in either direction for forward or for reverse movement of the car, respectively. These are the only possible positions for the motor cylinder. However the pump cylinder must have intermediate positions for its cylinder in order to control the car speed. The movement of this cylinder from its maximum speed position to any lower speed position automatically reduces the speed and applies a braking force to accentuate the retardation of speed. The same applies with respect to the pump in the movement of the rotor casing from a neutral position to the limit of its upward movement to effect a maximum displacement of the fluid.

In the case of the pump, the rotor casing may be moved to, and held in, any intermediate position between its neutral, or inoperative position, and the extreme of its movement effecting a maximum displacement of fluid. By this means, the motor may be driven in a forward or reverse direction at any desired speed. In the case of the motor, however, the rotor casing is always moved to the extreme limit of its movement in either direction, and never remains in a neutral position.

In the drawings, in which all sectional views are to be viewed in the directions indicated by the arrows on the corresponding sections lines:

Fig. 1 is a plan view of our improved hydraulic motor system.

Fig. 2 is a cross section through the variable displacement pump forming a part of said motor system, taken on the line 2—2 of Fig. 1 and corresponding, on a smaller scale, to a section taken on the line 2—2 of Fig. 14 and showing the pump in a neutral position.

Fig. 3 is a view similar to Fig. 2 but showing the pump in the position to effect maximum displacement of fluid.

Fig. 4 is a broken sectional view on an enlarged scale showing the valve arrangement illustrated at the right of Fig. 2.

Fig. 5 is a cross sectional view taken on the line 5—5 of Fig. 1.

Fig. 6 is a detail sectional view on an enlarged scale of a pressure valve controlling the discharge of fluid from the motor, taken on the line 6—6 of Fig. 1, and corresponding to a section taken on the line 6—6 of Fig. 5.

Fig. 7 is a cross section through a spacer casting and associated valve mechanisms taken on the line 7—7 of Fig. 1, corresponding, on a smaller scale, to a section taken on the line 7—7 of Fig. 14, the valve at the left of the view, controlling the operation of the pump, being in a neutral position, and the valve at the right, controlling the motor, being in the position for effecting forward movement, assuming the motor to be applied to an automobile.

Fig. 8 is a view similar to Fig. 7, but showing the pump-controlling valve in a position in which the pump will cause displacement of the fluid to effect operation of the rotor of the motor.

Fig. 9 is a broken sectional view, on an enlarged scale, of the valve mechanism in the position shown at the left of Fig. 8.

Fig. 9ᵃ is a section on the line 9ᵃ—9ᵃ of Fig. 9, viewed in the directions of the arrows.

Fig. 10 is an enlarged sectional view of the valve mechanism shown at the right of Figs. 7 and 8, but with the valve in its lowermost position, or that in which it will effect a reverse movement of the car.

Fig. 11 is a cross-section through the motor proper, taken on the line 11—11 of Fig. 1, with the motor cylinder in a theoretical position intermediate its forward or reverse position, and corresponding, on a smaller scale, to a section taken on the line 11—11 of Fig. 14.

Fig. 12 is a similar view to Fig. 11, showing the motor cylinder at the limit of its position for effecting a forward movement of the car.

Fig. 13 is a view similar to Fig. 12 showing the motor cylinder at the limit of its position for effecting a reverse movement of the car.

Fig. 14 is a longitudinal sectional view on an enlarged scale through the entire hydraulic motor system and taken on the line 14—14 of Fig. 1.

Fig. 15 is a perspective view of a rotor blade which is common to both the rotor of the pump and the rotor of the motor.

Fig. 16 is a similar view of one of two shoes, or guide-blocks, mounted on each blade of the pump and motor and slidable in circular grooves provided in the end walls of the respective casings of said pump and motor.

Fig. 17 is a plan view on an enlarged scale of a spacer casting interposed between the pump and the motor, affording the inner walls of the outer casings thereof, providing ports affording communications between the pump and the motor, and supporting the valve mechanisms shown in Figs. 7 and 8 for controlling the operation of the pump and motor, respectively.

Fig. 18 is a diagrammatic view, partly in outline and partly in section, illustrating our improved hydraulic motor system in its entirety and showing, more particularly, the lines of communication between the valve mechanism and the pressure devices controlling the operations of the pump and motor; and Fig. 19 is a plan view, partly in full and partly in dotted lines, showing the application of our improved hydraulic motor system to an automobile.

Referring now to the drawings, and particularly to the first three figures and Fig. 14 thereof, the letter A indicates, generally, a pump, B, a motor and C, a spacer casting interposed between the pump and motor. These three parts, with the associated valve mechanisms to be described, constitute the elements of our improved hydraulic motor system. The numeral 1 indicates the casing of the pump, which is of the elongated shape shown by Figs. 2 and 3, and is closed at one side by a flanged head 2, secured to the casing by bolts 3, and at its other side by a flanged end 4 of the spacer casting C, which is secured thereto by bolts 5. The head 2 is recessed on its interior to house a race-way for a ball bearing 6, supporting a shaft 7 which, in the assumed application of our motor system to driving an automobile, will be driven by an internal combustion engine 8 (Fig. 19), preferably a Deisel type internal combustion engine. The ball bearing 6 is held in position by nut 9 on the power shaft 7, and is inclosed by a plate 10 secured by bolts 11 on the end of head 2. The head 2 also provides a space for a ball-washer arrangement 12 interposed between an inner face of the head and an enlarged circular portion 13 of the power shaft which provides the body 14 of a rotor. The ball-washer arrangement 12 is employed to thoroughly seal the outer side of the pump casing, against escape of pressure oil to and through the ball bearing 6. To this end a practically perfect seal is provided by making one side bearing surface of the ring 12 of this assembly slightly eccentric to the other bearing surface. The ring is revolved by frictional contact with portion 13. The eccentricity is very slight but is sufficient to cause the ring bearing to continually wipe laterally over its contact surfaces and keep them clean and, in effect, to provide a hermetic seal against the escape of pressure oil. The rotor 14 is mounted in a casing 15, which is of the same elongated shape as the casing 1, but of smaller dimensions, to permit an up and down movement of the rotor casing 15 for a purpose to be presently described.

The casing 1 is provided at one end with a circular extension 16', which houses a circular bearing 17' projecting from one end of the rotor casing 15, and which is pivotally mounted concentrically within the housing 16' on a pin 18, mounted in the side walls 16 and 17 of the rotor casing. These side walls are secured to the casing by screws 19, and each is provided with a circular groove 20, shown by dotted lines in Figs. 2 and 3, and in the section Fig. 14. The rotor body 14 is provided with a series of radial grooves 21 extending from the enlarged portion 13 of the shaft through the periphery of the rotor body, in each of which grooves is mounted a blade 22, shown in detail in Fig. 15. Each of said blades is provided near its bottom and at opposite ends, respectively, with studs 23 on which is mounted a curved shoe 24, shown in detail in Fig. 16, which shoes are adapted to slidably engage in the circular grooves 20 provided on the inner sides of the walls 16 and 17 of the rotor casing. Thus the shoes 24 and grooves 20 insure a concentric rotation of blades 22 relative to the rotor casing. Extending through the inner wall 17 of the rotor casing 15 is a discharge port 25 and a suction port 26 located, respectively, at the front and rear of the rotor. The rotor casing 15 is provided intermediate its ends, and on the inner sides of its top and bottom walls, respectively, with segmental or arcuate contact surfaces 27 and 28, respectively, with which the outer ends of the blades 22 are adapted to cooperate in the rotation of the rotor. These contact surfaces correspond in length to the distance between any two blades 22 of the rotor, so that as the outer ends of these blades, in their rotation, engage and move over these surfaces, they form displacement chambers, which, in the neutral position are the same in area, but increase or decrease in area according as the rotor cylinder is moved up or down. These chambers are indicated in Fig. 2 by the numeral 29 as to the upper chamber and by the numeral 30 as to the lower chamber. According to the extent of upward movement of the rotor cylinder, the chamber 30 will be decreased in area while the upper chamber 29 will be increased in area. This, of course, produces a change in the volumetric displacement of the oil on opposite sides of the rotor, the greater displacement naturally occurring with the greater size of chamber. The contact surfaces of the cylinder are only one-eighth of the circumference of the cylinder circle and there is very little movement of the blades in and out of their slots. While great pressure is active against their sides causing friction, these blades are completely balanced as to pressure on their sides during the greatest part of the revolution of the rotor. When the pump cylinder is at the same center as the rotor there is no radial movement whatever of the blades and absolutely no wear of cylinder or blades while the pump is idling. When the rotor cylinder is moved to the limit of its movement in the upward direction, the lower chamber 30 will entirely disappear, while the upper chamber 29 will be increased in size to the maximum area and effect the maximum displacement of fluid. This condition is shown in Fig. 3, where the periphery of the rotor is shown to be rotating in contact with surface 28, thus entirely eliminating the space which, in the neutral position of the rotor casing shown in Fig. 2, provided the displacement 30. The casing 1 is provided centrally of its inner side, at the bottom, with an upward projection or stop 31, and the rotor casing 15 is provided centrally of its under side, at the bottom, with a similar projection 32, which is adapted, in the downward movement of the rotor casing, to engage stop 31 and arrest the rotor casing in the neutral position shown by Fig. 2. The end of the rotor casing opposite to that at which it is pivoted is provided with an outwardly projecting arm 33, by means of which the rotor casing is moved in an upward or downward direction through the medium of the mechanism now to be described.

The end of the casing 1, opposite to that at which the rotor casing is pivoted, is provided with a casing 1ᵃ which is bored to provide a cylinder 34 located at the upper side of the casing and a cylinder 35 located at its under side. Mounted in the cylinder 34 is a piston 36 provided on its under side with a plunger 37, which extends through the wall of the casing 1ᵃ and engages the upper side of arm 33. Mounted in the cylinder 35 is a piston 38 provided on its upper side with a plunger 39 which extends through the wall of the casing and engages the under side of arm 33. The cylinder 34 is closed at its upper end by a cover 40 having a bore 41 communicating with the interior of cylinder 34. Mounted in this cylinder between cover 40 and the upper end of piston 36 is a coil spring 42 which tends normally to force the piston 36 and its plunger 37 downward to place the rotor cylinder in the neutral position shown by Fig. 2. The cylinder 35 is closed at its lower end by a cover 43 which is bored at 44 to communicate with the interior of the cylinder. A pressure fluid pipe 45 communicates at one end with the port 41, and a pressure fluid pipe 46 communicates at one end with the port 44. These pipes will be later referred to.

To equalize pressures on the inner sides of the cylinders 34 and 35, the casing 1ᵃ is bored to provide a port 47, which communicates at its opposite ends with the respective cylinders by means of cross ports 48 and 49.

The motor proper of our hydraulic motor system is illustrated in Figs. 11, 12, and 13, and at the right hand side of Fig. 14, and is almost identical in construction with the pump above described. That is to say, it comprises an elongated motor casing 50, inclosing a rotor casing 51 pivotally mounted at one end on a pin 52 and having a projecting arm 53 at its opposite end. Within the rotor casing is a rotor 54 provided with radial blades 55, sliding in grooves 56, and formed integral with an enlarged portion 57 of a shaft 58. The blades 55 cooperate with arcuate contact surfaces 55a and 55b on opposite sides of the rotor casing. The casing 50 is closed at one side by a flanged end 59 of the spacer casting C, to which it is secured by bolts 60, and at its opposite side by a head 61, which is secured to the casing by bolts 62. The head 61 is recessed to house a race-way for a ball-bearing 63 in which shaft 58 is mounted, said ball-bearing being held in place by nut 64 on the shaft, and inclosed by means of a cover plate 65, secured to the head by bolts 66. The shaft 58 is a driven shaft and, as shown by Fig. 19, is adapted to be connected with the differential gearing 67 of the automobile.

The rotor casing 51 is closed at opposite sides by plates 68 and 69 secured to the casing by screws 70, each of these plates being provided in its inner side with a circular groove 71 for receiving shoes 72 mounted on studs 73 at the lower ends of blades 55, in exactly the same manner and for the same purpose as described with reference to the grooves 20 and shoes 24 of rotor 14 of the pump.

The spacer casting C is provided at opposite ends with two recesses, 74, 75, respectively, separated by a central web 76. In each of these recesses there is housed a ball-bearing, 77, 78, respectively, which support the inner ends of the shafts 7 and 58, and which are held in position thereon by nuts 79. The inner end of each of the shafts 7 and 58 is recessed to house a coil spring 80, which normally exert outward pressure against ball-bearing thrust-bearings mounted on opposite sides of the web 76 and indicated, respectively, by the numerals 81 and 82.

The provision of the ball washers and ball-bearing thrust-bearings represents the ideal method of mounting the two shafts 7 and 58 within the motor casings, as it provides an antifriction thrust bearing to take the thrust load of the springs. These springs are provided to produce a heavy load on the shaft seals at the opposite ends of the rotor to prevent any escape of oil under pressure at these ball and socket seal surfaces. These seal surfaces are self-lapping and self-maintaining leakproof sealed surfaces. The springs serve to hold them tightly together. These are the only possible points of leakage. It should be understood that the invention is not directly concerned with, nor dependent upon, the particular manner of mounting the two shafts described, and that other arrangements of bearings could be adopted if found desirable. As in operation the entire system is filled with oil, various ports and passages affording communication between the various chambers of the system and the spaces surrounding movable parts are provided to render the entire system self-lubricating. In Fig. 14, the spacer casting C is shown provided with a chamber 83 from which a passage 84 leads to the chamber 85 inclosed by casting 1, and in which the rotor casing 15 operates, and a similar passage 86 leads from chamber 83 to the chamber 87 inclosed in casing 50, and in which the rotor casing 51 operates. Ports 88 lead from the bottom of chamber 83 to the respective recesses 74 and 75.

The end of casing 50 at the opposite end to that at which rotor casing 51 is pivoted, is provided with a casting 89 affording at its upper side a cylinder 90 and at its under side a cylinder 91. Mounted in the cylinder 90 is a piston 92, having a plunger 93 on its under side extending through the end wall of casing 50 from the top thereof and engaging at its lower end the upper side of arm 53 on the rotor casing. The cylinder 91 is provided with a piston 94 having a plunger 95, extending upwardly from its upper side through the lower wall at the end of casing 50 and engaging the under side of the arm 53. The cylinder 91 is of greater diameter than the cylinder 90, and the plunger 95 is of greater diameter than the plunger 93. The reason for the greater diameter of piston 94 is to insure that while running at any forward speed the cylinder 51 will always be held above a central position, or, at the highest speed, in the position shown in Fig. 13. It will be apparent that, for any given pressure of oil, the force acting on piston 94 will always exceed any force that might be exerted on piston 92. At the same time as the plunger 95 is moved upward, as later explained, the oil in cylinder 91 which had been used to force piston 94 downward must be transferred to cylinder 90, beneath piston 92. As it would be impossible to transfer a greater volume of oil in cylinder 91 into cylinder 90, the plunger 95 is enlarged so that the space occupied by the oil in cylinder 91 above piston 94 is exactly equal to the space occupied by the oil in cylinder 90 below piston 92. The casting 89 is provided with a passage 96 from the upper end of which a port 97 leads into cylinder 90 in the space below piston 92, and from the lower end of which a port 98 leads into cylinder 91 in the space above piston 94.

The cylinder 90 is closed by a cover 99 provided with a port 100 communicating with cylinder 90 in the space above piston 92 and a pressure fluid pipe 101 communicates at one end with this port 100.

The cylinder 91 is closed by a cover 102 which is provided with a port 103 communicating with cylinder 91 in the space below piston 94 and a pressure pipe 104 communicates at one end with this port.

The pump casing 1, the chamber 83 in spacer casting C and the motor casing 50, are all tapped and provided with removable plugs 105 to allow air to be entirely driven out of all spaces within the system, which, as stated, is occupied solely by a fluid, preferably a low temperature, pour-test oil having anti-freezing characteristics. The air is moved from the system in order to eliminate the production of heat and to provide an incompressible fluid, so that when pressure is applied thereto, the force will be exerted equally in all directions under a well known law of hydraulics.

According to our invention, with the rotor 15 of the pump being rotated by the engine 8 of the automobile, the pressure of fluid is exerted to raise the outer end of the rotor cylinder 15 from the neutral position shown in Fig. 2, to the position shown in Fig. 3, in which the maximum displacement of fluid will be effected by the blades 22 of the rotor cooperating with the contact surface 27 on the upper side of the rotor casing. The pressure thus created on the fluid is caused to operate on one or the other of the pistons 92, 94, controlling the position of the rotor casing 51 of the motor at the will of the operator and, also, to rotate rotor 54 in one direction or the other according to the position of arm 53; and the mechanism for effecting and controlling the flow of the oil through the system by the power exerted through the rotation of the rotor 14 of the pump, will now be described, referring particularly to Figs. 7 to 10 of the drawings in connection with the figures previously used.

The spacer casting C is provided at one end with a discharge port 106 and at its other end with a suction port 107. The port 106 aligns with, and forms a continuation of, the discharge port 25 from the rotor casing 15 of the pump and with a similar discharge port 108 leading through one side of the motor casing 50. In like manner, the suction port 107 of the spacer casting C aligns with, and forms a continuation of, the suction port 26 leading from one side of the rotor casing 15 of the pump, and aligns with, and forms a continuation of, a similar port 109 leading from one side of the rotor casing 51 of the motor.

Secured on one side of the spacer casting C, as by means of bolts 110, is a casting which is suitably bored and recessed to provide the casing for a fractionating valve mechanism, which valve casting is indicated generally in Figs. 7 and 8 by the letter D. Extending upward through a stuffing box 111 provided on the lower end of this valve casting is a valve rod 112, the lower end of which is pivotally connected at 113 to the inner end of lever 114, which is pivotally mounted intermediate its end at 115 on a hanger 116, pivotally mounted at 117 at its upper end on a support provided on the lower end of valve casting D. Pivotally secured at 118 to the outer end of 114 is a push rod 119, the upper end of which, as shown diagrammatically in Fig. 13, extends through the floor 120 of the car and is connected to a treadle 121 pivotally mounted at its inner end at 122 on the floor of the car and having its outer end normally pressed upward by means of a spring 123. The valve rod 112 is shaped in its upper end portion to provide a spool valve 124, having an upper valve head 125, and a lower valve head 126, which work in a cylinder 127 mounted on the inside of valve casting D. Below the lower valve head 126 the valve rod 112 is provided with two separate shoulders 128 providing between them a bearing portion on which is loosely mounted a toggle connection 129 of a toggle lever having two arms 130 and 131, the arm 130 being pivotally secured at 132 to a fixed part of the valve casting, and the arm 131 being pivotally secured at 133 to a piston 134 working in a cylinder chamber 135 provided in an enlargement of one wall of the casting. A passage 136 connects the cylinder chamber 135 with a port 137 bored in the enlarged wall of the valve casting, and to this port is connected the other end of pipe 46 previously referred to as being in communication with the interior of cylinder 35 in the space below the bottom of the piston 38, Figs. 2 and 3.

The valve casting D is cored to provide a chamber 138, from which leads a port 139, which communicates with an opening 140, leading into the discharge port 106. The wall of cylinder 127 is provided at the bottom and top thereof, respectively, with ports 141 and 142 which communicate with chamber 138. The interior of valve casting D is also provided with an intermediate port 143, which entirely surrounds the cylinder 127, the latter being provided with openings 144 which communicate with said port. The wall of the cylinder 127 on the side opposite that having the ports 141 and 142, and near its lower end, is provided with two ports 145 and 146, which communicate with a chamber 146ª, formed in the wall of the valve casting at the inner end of port 137, and in its upper portion with two ports 147 and 148, which communicate with a chamber 148ª formed in the wall of the valve casting. The intermediate openings 144 in the wall of cylinder 127 serve to maintain the port 143 in communication with a circular space 149 in the interior of the cylinder 127 surrounding the spool valve 124 between the valve heads 125 and 126.

By comparing Fig. 9 with Fig. 9ª it will be seen that chamber 148ª can only communicate with chamber 138 through ports 148 and 142. In like manner, chamber 146ª can only communicate with chamber 138 through ports 145 and 141.

Connected with the chamber 148ª is one end of the pipe 45, the other end of which has been previously described as communicating with the interior of cylinder 34 (Figs. 2 and 3); and connected with the port 143 is one end of a pipe 151 the other end of which communicates with the suction port 107 of the spacer casting, which in turn communicates with the suction port 26 of the pump. Secured by bolts 152 on the opposite side of the spacer casting C to that at which the valve casting D is secured, is a valve casting E, shown on an enlarged scale in Fig. 10, which is provided on its interior with a chamber 153 communicating through a port 154 with an opening 155 in the side wall of the spacer casting, which opening in turn communicates with the suction port 107 of the spacer casting. The valve casting E is suitably cored to receive a cylinder 156 provided at one side near its upper end with ports 157 and 158 and near its lower end with similar ports 159 and 160, and centrally of its length with an enlarged port 161. Mounted in the cylinder 156 is a spool valve 162, having a lower valve head 163, and an upper valve head 164. The wall of cylinder 156 is provided on one side with an upper port 165 and a lower port 166, both of which communicate with chamber 153. A third port 167, located centrally of the casting and surrounding the cylinder, is in communication through port 161 with space 168 on the interior of the cylinder 156 between the valve heads 163 and 164 and surrounding the spool valve 162. Communicating with the port 167 is one end of a pipe 150, the opposite end of which communicates with the discharge port 106 of the spacer casting which in turn communicates with the discharge port of the motor. The spool valve 162, which, as shown, is a balanced valve, as are all the other spool valves, is mounted on, or a part of, a valve rod 169, which works through a stuffing box 170 provided at the upper end of valve casting E, and is pivotally connected at its upper end at 171 to the outer end of a lever 172, which is pivoted at 173 on the upper end of a bracket 174, projecting upwardly from the top of casting E. Pivotally connected at 175 to the outer end of lever 172 is an operating rod 176, which, as shown by Fig. 18, extends through an opening in the floor 120 of the car and is pivotally connected to one end of a foot pedal 177, which is pivotally mounted intermediate its ends at 178 to a support 179 on the floor of the car.

The pipe 101, previously referred to as communicating at one end with the interior of cylinder 90 Figs. 11, 12 and 13, leads to the valve casting E and has its other end communicating with a chamber 101ª formed in the valve casting and communicates with the ports 157 and 158. The pipe 104, previously referred to as communicating at one end with the cylinder 91, leads to casting E and has its other end communicating with a chamber 104ª which communicates with ports 159 and 160. Chamber 101ª can only communicate with chamber 153 through ports 157 and 165; and chamber 104ª can only communicate with chamber 153 through ports 160 and 166.

The operation of the device as thus far described is as follows:

The shaft 7 being placed in rotation to drive the rotor 14, so long as its casing is held in neutral position by the spring 42, as shown in Fig. 2, no pressure is developed by the pump, as the displacement chambers 29 and 30 are equal, and there is no displacement of fluid. To start the pump, the operator exerts pressure on the foot treadle 121. This pressure is transmitted through operating rod 119 and lever 114 to valve rod 112 and causes an upward movement of spool valve 124. In this upward movement the toggle 129 will move toggle arm 131 upward and force piston 134 outward. This movement of the piston 134 will force fluid in the cylinder through passage 136 into port 137, thence through pipe 46 and port 44 (Fig. 2) to cylinder 35 thereby forcing piston 38 upward, and through plunger rod 39, moving arm 33 on cylinder 15 upward, lifting contact 32 off of stop 31 and causing a change in size of displacement chambers 29 and 30. That is to say, increasing the size of chamber 29 and decreasing the size of displacement chamber 30. This causes the pump to produce a pressure in the discharge port 25 which is immediately transferred through port 106 and communicating ports 140 and 139 to port 141 (Figs. 7 and 9). When pressure was exerted on the foot treadle to move the valve rod 112 upward to operate the toggle 129, the resulting upward movement of spool valve 124 moved the valve heads 125 and 126 to uncover port 147 and cover port 148 (Fig. 9) and to uncover ports 141 and 145 and cover ports 142 and 146. With valve 124 in this position, pressure developed by pumping is exerted on piston 38 through ports 141 and 145 and connecting pipe 46. As piston 38 in cylinder 35 continues to move upward, displacement of fluid by the pump increases until full pressure is developed and cylinder 15 is moved to its extreme upward position, as shown in Fig. 3.

The spring 123 operates to return foot treadle 121 to release position when pressure on the foot treadle is removed. When this occurs, valve 124, through the connections described, is caused to move downward until valve head 125 closes port 147 and uncovers ports 142 and 148; and valve head 126 closes ports 141 and 145 and uncovers port 146. It will now be seen that pressure from discharge port 106 is exerted through port 139 to port 142 and through port 148 and pipe 45 to cylinder 34, and this pressure forces piston 36 downward, and through plunger 37 forces arm 33 and cylinder 15 back to neutral position, with contact 32 engaging stop 31. The return of the cylinder 15 to neutral position is also assisted by the pressure of spring 42 in cylinder 34 acting on piston 36.

Port 146 is uncovered in the downward movement of valve 124, and port 147 is uncovered in the upward movement of said valve. These ports connect to port 143 and through pipe 151 connect with pump suction port 107 (Figs. 7, 8, and 18). These ports 146 and 147 permit the pressure to escape from the space 149 in the cylinder of the valve casting D between the valve heads 125 and 126 in the upward or downward positions of valve 124.

The operator, by movement of the foot treadle 121, can cause the cylinder 15 to assume any desired position for the amount of pump displacement required. To make this operation clear, it may first be explained that when the spool valve 124 is raised to the position shown in Figs. 8 and 9, the pressure oil will continue to pass through pipe 46 into cylinder 35 until the rotor cylinder 15 has been raised to the position shown in Fig. 3, in which the motor will be driven at maximum speed. Obviously, one does not drive an automobile at all times at maximum speed, and therefore we have provided means to enable the operator to maintain the car at any desired speed. This may conveniently be effected by the simple arrangement illustrated at the lower portion of Fig. 9, where it will be seen the shaft 112 is provided at one side with a shallow recess 180, and the wall of the casting above the stuffing box 111 is drilled to provide a hole 181 in which is mounted a detent 182, having a rounded end adapted to engage in the recess 180. This detent is normally forced inward by a spring 183 held under compression by a plug 184 screwed into the outer end of opening 181. The relation of the detent 182 and recess 180 is such that when the detent is engaged in the recess, the heads 125 and 126 of spool valve 124 will be in a position to cover the ports 145 and 146, and 147 and 148, so that there can be no passage of pressure fluid toward or from either of the cylinders 34 or 35 of the pump casing; hence, there can be no pump pressure exerted to change the position of arm 33 of the rotor casing. Thus, after the operator has depressed the treadle 121, and the car has reached the speed at which he desires to travel, he releases pressure on the treadle, and the spool valve 124 will be drawn down until its recess 180 reaches a position opposite the detent 182, which latter is forced inward by its spring into engagement with the recess and prevents further downward movement of the valve. The casing 15 of the pump rotor will now be held from movement, as above explained. If it is desired to increase the speed of the automobile, the operator again depresses treadle 121 to move valve 124 to substantially the position shown in Fig. 9, permitting the pressure oil to again pass through pipe 46 to cylinder 35 to raise the rotor casing 15. When the desired speed has been attained, the valve 124 is again permitted to descend until locked by the detent 182 against further movement. When it is desired to entirely arrest the movement of the car, the valve is permitted to descend to the limit of its downward movement, as shown in Fig. 7, when the cylinder 15 will be returned to neutral position by pressure of oil in cylinder 34, and the power of spring 42, both acting on piston 36, as previously explained.

To permit of slight play of the push rod 119, without moving valve 124, a slotted connection is provided between hanger 116 and pivot 117, as shown in Figs. 7 and 8 at 188.

The tension of the spring 183 is only great enough to offer slight resistance to movement of recess 180 in either direction beyond detent 182, so that the valve may be readily raised by pressure on the foot treadle 121 to move the recess 180 above the detent, or the same may be as readily moved below the detent by the power of spring 123. At the same time, the foot can readily feel when the detent passes into the recess, and can hold the valve in that position with as much facility as, in an ordinary car, the operator can maintain sufficient pressure on the throttle to cause the car to travel at a given uniform rate of speed. However, in actual practice, a suitable dial and cooperating pointer, mounted on the dash-board, could be used to indicate the closed position of the valve.

The valve 124 is provided with a bored passage 185, shown by dotted lines in Fig. 9, which opens above the head 125 and below the head 126, as shown at 186, to permit the passage of fluid therethrough in the operation of the valve and to partially balance the latter.

For the same reason, the valve 162, Fig. 10, is bored to provide a passage 187 which opens below the head 163 and above the head 164, as indicated at 189.

We will now describe the means by which the power generated by the displacement of fluid by the pump A is controllably utilized in driving the rotor 54 and thus driving the shaft 58.

In the case of the pump, the rotor cylinder is adapted to be moved from a neutral position to any intermediate position or to one effecting maximum displacement. In the case of the motor B, however, the rotor cylinder 51 has only a theoretical neutral position, in which it would be supported by the plunger rods 93 and 95 at equal distances from the top and bottom of the motor casing 50, as shown in Fig. 11, and from this position would be moved to the limit of its movement in a downward direction, as shown by Fig. 12, to effect a forward movement of the car, or to the limit of its movement in an upward direction, as shown by Fig. 13, to effect a backward movement of the car. In other words, the position of the rotor shown in Fig. 11 represents the dividing line between the forward and the reverse positions of the rotor; but this position is an impermanent one, and is occupied only momentarily by the rotor in passing from one of its extreme positions to the other.

Referring now to Figs. 7, 8, 10 and 18 of the drawings, in connection with Figs. 11, 12 and 13, when the pump A is in operation, the pressure fluid therefrom is transmitted through discharge port 25 of the pump and 106 of the spacer casting to the high pressure side, or port 108, of the motor. The low pressure side, or port 109, of the motor is connected through suction port 107 of the spacer casting to suction port 26 of the pump.

Pressure port 106 is connected to port 167 of valve casting E by pipe 150; and suction port 107 is connected to port 143 of valve casting D by pipe 151. When the operator desires the motor to run in a forward direction, he operates foot treadle 177 to force its end connected with rod 176 downward, thereby raising valve 162 to the upward position shown in Figs. 7 and 8, in which position ports 157 and 159 are covered and ports 158 and 160 are opened. This will permit the pressure fluid from port 106 to enter port 167 through pipe 150 and pass through ports 161 and 158 and pipe 101 to cylinder 90, and exert pressure on piston 92 to move it downward, which will force plunger rod 93 and the arm 53 downward and cause rotor cylinder 51 to take the position shown in Fig. 12. In this position, pressure fluid entering through the port 108 will exert pressure on blades 55, now projecting at a maximum distance from the lower side of the rotor, and cause the same to rotate in the direction indicated by the arrow in Fig. 12. After passing underneath the rotor, the fluid escapes through port 109 and enters the pump casing through port 26 to be again circulated as before. The downward movement of arm 53 above described forced piston 94 downward, and the oil in cylinder 91 passes through pipe 104, port 160, port 166, chamber 153 and ports 154 and 155 to suction ports 107 and 26 of the pump.

For reversing the rotation of the motor, the operator presses the free end of the treadle 177 downward, thereby moving valve 162 downward, or to the position shown in Fig. 10, in which position ports 157 and 159 are open and ports 158, 160 and 166 are covered. In this position, the pressure fluid passes from pipe 150 through ports 167, 161 and 159, and through pipe 104 into cylinder 91, exerting pressure on piston 94 to force plunger rod 95 and arm 53 upward, thereby placing cylinder 51 in the extreme position for the reverse rotation of the rotor shown by Fig. 13. When valve 162 is in the downward position shown in Fig. 10, pressure from cylinder 90 is released through pipe 101, through port 157 to port 165, and chamber 153 to ports 154 and 155, thence to port 107.

Referring now particularly to Figs. 1, 5 and 6, the numeral 190 indicates the casing of a relief valve, inclosing a valve seat 191 for a valve 192, held against the seat by a coil spring 193 retained in the valve casing by a screw plug 194 which may be adjusted to regulate the tension of spring 193. Valve 192 is guided in its movements by a stem 195 working in a bore 196 provided in an extension 197 on plug 194. The casing 190 is formed integral with the head 61 of the motor, and its interior communicates with a passage 198 formed in the head and leading to a port 199 which communicates with the low pressure side of the motor, which in turn communicates with the suction port 107 of the pump. Extending through the valve seat 191 is a port 200, which communicates with the high pressure side of the motor.

The purpose of the relief valve is to provide against damage to the motor should the operator unintentionally permit pressure in the motor casing to build up to the point where damage might result. In such case, the valve 192 will be unseated, allowing the fluid to pass through passage 198 to the low pressure side of the motor. This condition would arise when the pump cylinder is moved toward, or entirely to, its neutral position, while the car is moving forward. In such case the pump is delivering less fluid than the motor was using at the higher car speed, or none at all if the cylinder is in the neutral position, and the motor then becomes a pump, driven by the rear wheels of the car. High pressure is created on the discharge side of the motor, and such higher pressure acts as a brake force to retard the car. At any given pressure regulated by spring 193, the valve 192 will open to permit escape of pressure fluid and its passage to the suction side of the motor. The tension of the spring is adjusted to afford enough resistance to provide an emergency brake when necessary.

In Figs. 12 and 13, passages 201 are shown which afford communication between cylinder 51 and casing 50, to equalize the pressure on the inside and outside of said cylinder. Similar passages 202, indicated by dotted lines in Figs. 2 and 3, serve the same purpose for the pump cylinder and its casing.

We desire to emphasize the importance of the construction employed for the pump and the motor, with special reference to the inlet and discharge ports of the rotor casing, and the relatively slight area of contact surface provided in each casing for cooperation with the blades of the rotor.

Referring first to the ports, say, ports 25 and 26 of the pump casing, illustrated in Figs. 2 and 3, it will be seen that these ports have a length, or height, substantially of the diameter of the rotor, which permits practically the instant passing of pressure oil to all parts of the casing on the inlet side and to the spaces between the rotor blades, and its equally rapid discharge from the pump casing and application to the blades of the motor rotor to rotate the latter and return to the inlet side of the pump.

Referring now to the limited contact surfaces provided at opposite sides of the cylinder, for cooperation with the ends of the blades of the rotor, it will be readily apparent that the same amount of blade area on opposite sides of the rotor moves in the clear and is subject to contact with the fluid, being at all times therefore, in a substantially balanced condition, and that a maximum of only four blades at a time are directly involved in the displacement function of the rotor. The relation of the ends of the blades with the contact surfaces of the rotor cylinders is controlled by means of the shoes on the blades working in circular grooves in the walls of the casings and not, as usual, by frictional engagement of the ends of the blades with the contact surface, or inner wall, of a cylinder. There is necessarily provided a minute clearance space between the ends of the blades and the contact surfaces, which is always filled with a film of oil so that the ends of the blades make sealing contact with such surfaces.

As a result of the features emphasized above, very little friction will result from the operation of the rotors, and the hydraulic system as a whole will operate practically noiselessly and with extreme smoothness.

We wish it to be understood that the treadle mechanisms we have described for operating valves 124 and 162 controlling the positions of the rotors of the pump and motor, respectively, are merely illustrative, and that any other means, or any other character of mechanisms could be employed for this purpose without in any manner departing from the spirit of our invention.

Referring, finally, to Fig. 19, we have shown a constant speed engine 8 which drives the pump, and the speed of which is governed by an automatic governor G, which is of a conventional type, and does not require illustration in detail. Such governor, as is well known, acts to increase the fuel supplied as the load increases, and vice versa. In reference to this arrangement it remains to be stated that in some instances it may be desirable to vary the controlled speed of the engine by changing the adjusted speed of the engine governor.

We claim:

1. A hydraulic motor system, comprising, in combination, a variable displacement rotary pump, a motor having a rotor provided with a plurality of radial, slidable blades, independent, oil-filled cylinders for said pump and motor having communicating ports permitting the transfer of pressure fluid from the discharge side of the pump to the inlet side of the motor, and its return to the inlet side of the pump from the outlet side of the motor, the rotor cylinder of the motor being elongated and mounted for pivotal movement at one end and provided centrally and interiorly on opposite sides with arcuate contact surfaces cooperating with the outer ends of the blades, hydraulically-operated means for varying the displacement of the pump, hydraulically-operated means for raising or lowering the cylinder of the motor to transfer the maximum area of blade exposure to one side or the other of the motor rotor to cause the same to rotate either in a forward or reverse direction and manually-operated valves for controlling the operations of said hydraulic means.

2. A hydraulic motor system comprising, in combination, a variable displacement rotary pump having a rotor provided with a plurality of radial, slidable blades, a motor having a rotor also provided with a plurality of radial, slidable blades, independent oil-filled cylinders for said pump and motor having communicating ports permitting the transfer of pressure fluid from the discharge side of the pump to the inlet side of the motor, and its return to the inlet side of the pump from the outlet side of the motor, each of said cylinders being elongated and pivotally mounted at one end and provided centrally and interiorly on opposite sides with arcuate contact surfaces for cooperating with the ends of the blades of the respective rotors, means for normally supporting the pump cylinder in a neutral position, in which opposite sides of its rotor will be at equal distances from said contact surfaces, hydraulically-operated means for raising the rotor cylinder of the pump to any desired extent to increase the area of the blades cooperating with the contact surface at one side of said rotor while decreasing the blade area at the other, hydraulically-operated means for raising or lowering the rotor cylinder of the motor to cause one of said contact surfaces to engage one side of the surface of the rotor while the other contact surface is moved a maximum distance from the opposite side to provide displacement chambers between each two blades of the rotor as they sweep over the latter contact surface and manually-operated valves for controlling the operation of said hydraulic means.

3. A hydraulic motor system comprising, in combination, a variable displacement rotary pump having a rotor, a motor having a rotor, independent, oil-filled, elongated cylinders for said pump and motor having communicating ports at opposite ends permitting the transfer of pressure fluid from the discharge side of the pump to the inlet side of the motor, and its return to the inlet side of the pump from the outlet side of the motor, each of said cylinders being pivotally mounted at one end, hydraulically-operated means controllable at will for raising and lowering the free end of the pump cylinder and thus varying the displacement of the pump, independent, hydraulically-operated means for raising and lowering the free end of the motor cylinder to change the relation of the motor rotor relative to the inlet for pressure from the pump to change the direction of rotation of the motor, and manually operated valves for independently controlling the operations of the hydraulic means.

4. A hydraulic motor system, comprising, in combination, a variable displacement rotary pump having a rotor provided with a plurality of radial, slidable blades, a motor having a rotor also provided with a plurality of radial, slidable blades, independent, oil-filled cylinders for said pump and motor having communicating ports permitting the transfer of pressure fluid from the discharge side of the pump to the inlet side of the motor, and its return to the inlet side of the pump from the outlet side of the motor, each of said cylinders being pivotally mounted at one end and having an arm projecting from its other end, a casing enclosing each cylinder and providing at one end a pair of cylinders located on opposite sides, respectively, of the casing, pistons mounted in said cylinders and having plungers engaging, respectively, opposite sides of said arm, and valve mechanism associated with each pair of cylinders and independently operable at will for permitting pressure fluid from the pump to enter either one of the pair of cylinders to raise or lower the corresponding arm, while permitting the return of pressure fluid from the other cylinder to the suction, or inlet side of the pump.

5. A hydraulic motor system, comprising, in combination, a variable displacement rotary pump having a rotor provided with a plurality of radial, slidable blades, a motor having a rotor, independent, oil-filled cylinders for said pump and motor having communicating ports permitting the transfer of pressure fluid from the discharge side of the pump to the inlet side of the motor, and its return to the inlet side of the pump from the outlet side of the motor, pressure fluid devices for operating the cylinder of said pump to increase or decrease the effective blade area at one side of its rotor and thereby correspondingly vary the displacement of fluid by the pump, manually operated means for creating pressure in one of said devices to enlarge the displacement area at one side of the pump rotor and thereby initiate the production of pressure fluid by the pump, a valve operable thereafter by said manually operated means to establish communication between the pressure side of the pump and one side of the pressure device previously operated, to automatically continue the operation of said pressure device while releasing pressure from the other side of said pressure device, and means for changing the relation of the motor rotor relative to the inlet for pressure fluid from the pump, to change the direction of rotation of the motor.

6. In hydraulic, oil-filled motor system in combination with a spacer casting having ports at opposite sides, a pump casing and a motor casing secured, respectively, to opposite ends of said casting, each of which casings incloses a cylinder movable in a vertical plane and having ports registering with the ports of said casting, and a rotor interposed between its ports having a plurality of radial, slidable blades, arcuate contact surfaces provided interiorly on the top and bottom of each cylinder and with which the blades of its rotor cooperate, separate hydraulic devices for raising and lowering each cylinder, and valve mechanisms supported on said spacer casting and independently operable at will for controlling said hydraulic devices, in the one case to raise the pump cylinder regulated distances to effect a required displacement of oil for operating the motor at a given speed, and in the other to raise or lower the motor cylinder to transfer the maximum area of blade exposure to one side or the other of its rotor to cause the same to rotate in a forward or reverse direction.

EDWARD WILSON.
EDWARD H. WILSON.
JOHN H. LINHARDT.